(12) United States Patent
Byrne

(10) Patent No.: US 7,044,487 B2
(45) Date of Patent: May 16, 2006

(54) HEATED ANTI-SLIP STEP FOR A MOTOR VEHICLE

(75) Inventor: Robert M. Byrne, Lima, OH (US)

(73) Assignee: American Trim, LLC, Lima, OH (US)

( * ) Notice: Subject to any disclaimer, the term of this patent is extended or adjusted under 35 U.S.C. 154(b) by 51 days.

(21) Appl. No.: 10/786,877

(22) Filed: Feb. 25, 2004

(65) Prior Publication Data

US 2005/0184482 A1 Aug. 25, 2005

(51) Int. Cl.
*B60R 3/00* (2006.01)
(52) U.S. Cl. ............... 280/163; 280/164.1; 280/291
(58) Field of Classification Search ............. 280/163, 280/164.1, 291, 202
See application file for complete search history.

(56) References Cited

U.S. PATENT DOCUMENTS

| | | |
|---|---|---|
| 2,278,191 A | 3/1942 | Burnett |
| 2,281,822 A | 5/1942 | Bills et al. |
| 3,093,216 A | 6/1963 | Dunham |
| 3,181,440 A | 5/1965 | Mullaney et al. |
| 4,017,093 A | 4/1977 | Stecker, Sr. |
| D258,465 S | 3/1981 | Studinski |
| 4,289,819 A | 9/1981 | Kalman |
| 4,343,119 A | 8/1982 | Bahnfleth |
| 4,749,191 A * | 6/1988 | Gipson et al. ........... 280/164.2 |
| 4,794,228 A | 12/1988 | Braun, Jr. |
| 5,026,082 A | 6/1991 | Sipp et al. |
| 5,136,143 A | 8/1992 | Kutner et al. |
| 6,041,821 A | 3/2000 | Grossman |
| 6,056,078 A * | 5/2000 | Pham ..................... 180/219 |
| 6,140,609 A * | 10/2000 | Jones ..................... 219/202 |
| 6,152,470 A | 11/2000 | Stuart et al. |
| 6,230,745 B1 | 5/2001 | Brooks |
| 6,438,909 B1 | 8/2002 | Birch et al. |
| 6,539,681 B1 | 4/2003 | Siegmund |
| 2005/0117969 A1 | 6/2005 | Byrne et al. |

OTHER PUBLICATIONS

Commonly Owned U.S. Appl. No. 11/163,143, filed Oct. 6, 2005, 17 pages.

* cited by examiner

*Primary Examiner*—Christopher P. Ellis
*Assistant Examiner*—Cynthia F. Collado
(74) *Attorney, Agent, or Firm*—Rankin, Hill, Porter & Clark LLP

(57) ABSTRACT

The present invention is directed to a heated anti-slip step for a motor vehicle. The step includes a metal tread plate having a plurality of grip structures extending upwardly from a top surface of the tread plate. A plurality of drain holes extend through the tread plate. An electrical resistance heater is disposed proximate to the tread plate and is operable to heat the step so as to melt any snow or ice that may be present on the step.

11 Claims, 8 Drawing Sheets

US 7,044,487 B2

HEATED ANTI-SLIP STEP FOR A MOTOR VEHICLE

BACKGROUND OF THE INVENTION

The present invention generally relates to steps and, more particularly, to steps for heavy duty motor vehicles, such as industrial trucks, to facilitate the ingress and egress of operators to and from cabs of the trucks.

Conventionally, an industrial truck, such as a semi-truck, is provided with one or more steps to facilitate the ingress and egress of an operator to and from a cab of the truck. During the winter, such steps often become covered with ice, rendering them slippery. In order to provide better traction under such conditions, steps are typically provided with raised grip structures disposed around openings formed in the steps. The grip structures usually have curved side walls defining continuous top rims. While grip structures of this construction will improve the grip of a step, the continuous nature of the top rims can still render the top rims and, thus, the step quite slippery when the step is covered with ice.

In addition to providing grip structures, it has been proposed to run an exhaust pipe under a truck step to prevent snow from accumulating on the step. Such an arrangement is disclosed in U.S. Pat. No. 2,501,819 to Kloepper. Unfortunately, the arrangement of the Kloepper patent is only effective to melt snow and ice when the engine of the truck is running. Moreover, the arrangement of the Kloepper patent requires the exhaust system of the truck to be specially designed (or re-designed) to route a portion of the exhaust system under the step(s) of the truck. Such routing may not be desirable, or even feasible.

Based on the foregoing, there is a need in the art for an improved anti-slip step for a truck that is specially adapted to reduce slippage under icy conditions. The present invention is directed to such an anti-slip step.

SUMMARY OF THE INVENTION

In accordance with the present invention, an anti-slip step is provided. The step includes a metal tread plate with a top surface and a bottom surface. The tread plate has a plurality of drain holes extending therethrough. A plurality of grip structures extend upwardly from the top surface of the tread plate. An electrical resistance heater is disposed proximate to the tread plate and is operable to heat the step so as to melt any snow or ice that may be present on the step.

In accordance with one feature of the present invention, the anti-slip step is for use on a vehicle having a chassis, a plurality of wheels mounted to the chassis, and an operator compartment supported on the chassis. The step is disposed proximate to the operator compartment and supports an operator of the vehicle when the operator enters or leaves the operator compartment. An electrical circuit connects the heater to a battery of the vehicle. The electrical circuit is operable to supply power from the battery to the heater, thereby causing the heater to heat the step and melt any snow or ice that may be present on the step.

BRIEF DESCRIPTION OF THE DRAWINGS

The features, aspects, and advantages of the present invention will become better understood with regard to the following description, appended claims, and accompanying drawings where:

DETAILED DESCRIPTION OF THE PREFERRED EMBODIMENTS

Figure 1:
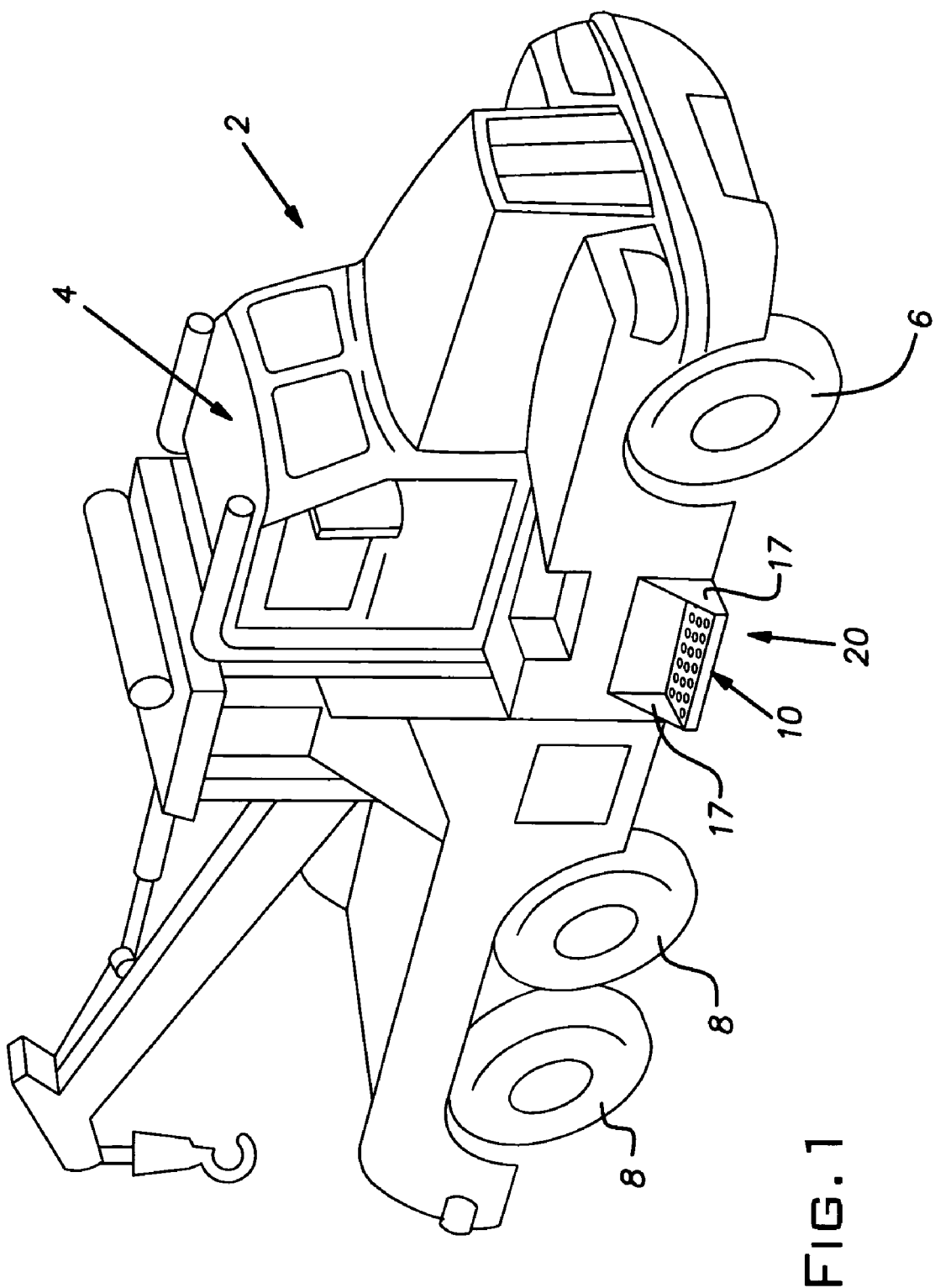
FIG. 1 is a side perspective view of a truck having a step embodied in accordance with the present invention.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Referring now to FIG. 1, there is shown a truck 2 having a step 10 embodied in accordance with the present invention. The truck 2 includes a chassis (not shown) that supports a cab 4 for accommodating an operator that drives the truck 2. A pair of front wheels 6 and two pairs of rear wheels 8 are mounted to the chassis for rotation relative thereto. An engine (not shown) is mounted to the chassis, forward of the cab 4. At least one pair of the rear wheels 8 is driven by the engine through a suitable drive system known in the art. The step 10 is secured to the cab 4 or the chassis and is adapted to support the weight of an operator climbing up into the cab 4 or climbing down from the cab 4.

Figure 2:
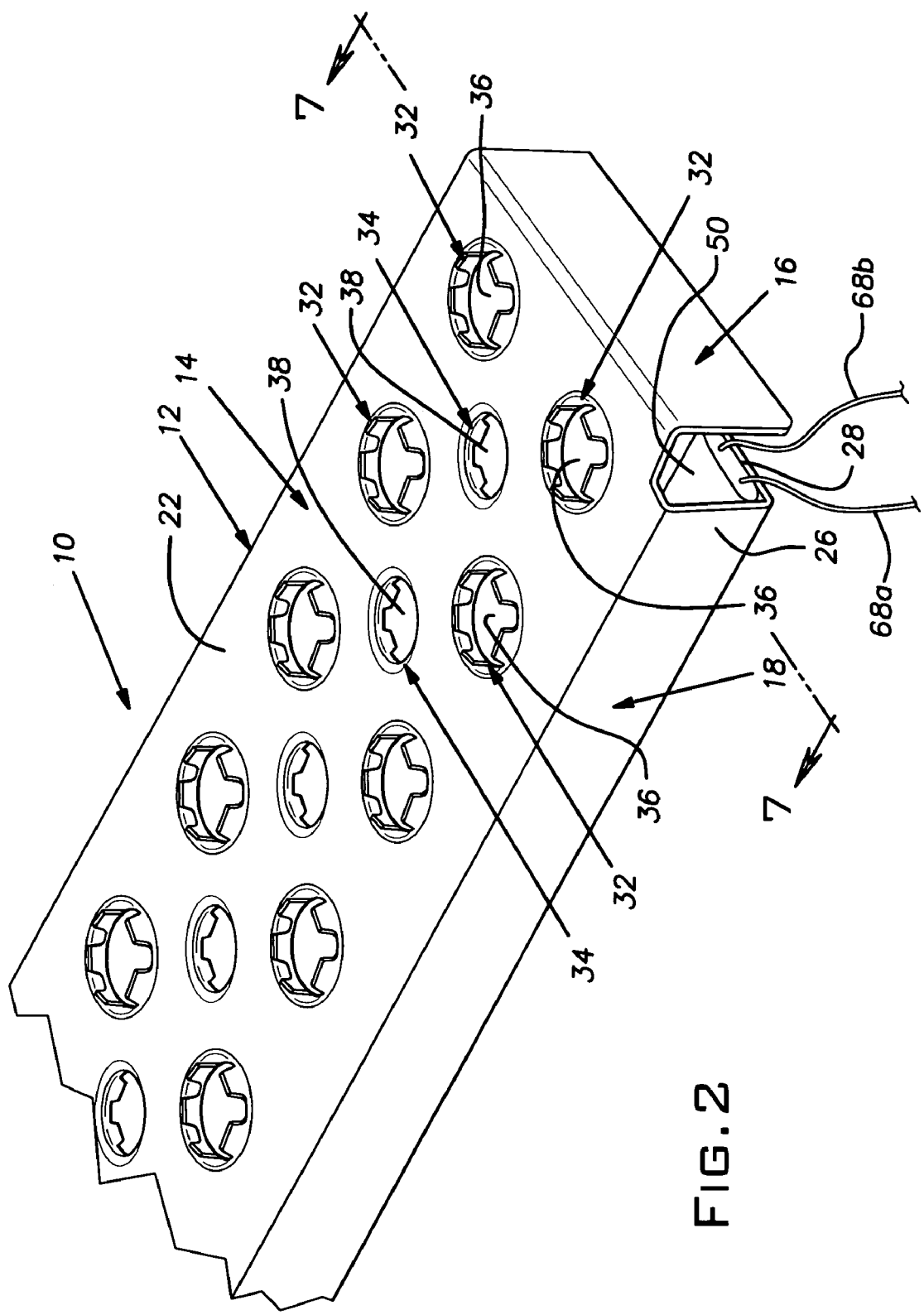
FIG. 2 is a top perspective view of the step having heating devices secured thereto and constructed in accordance with a first embodiment of the present invention.

Referring now to FIG. 2, there is shown a portion of the step 10. The step 10 includes a support structure 12 that is composed of a heat conductive material, such as steel, or more preferably, aluminum. The support structure 12 includes a tread plate 14, a pair of opposing end flanges 16, a front flange 18 and a rear flange 19 (shown in FIG. 7). The tread plate 14 is rectangular and includes top and bottom surfaces 22, 24. The end flanges 16 are joined at bends to opposing end portions of the tread plate 14, respectively, and extend downwardly therefrom. Although not shown, the end flanges 16 may have holes formed therein for receiving screws, bolts or other elongated fasteners that may be used to secure the step 10 between side supports 17 of a stair 20 on the truck 2. The front flange 18 and the rear flange are joined at bends to opposing front and rear side portions of the tread plate 14, respectively, and extend downwardly therefrom. Each of the front and rear flanges 18, 19 has an L-shaped cross-section and includes a downwardly-extending first member 26 joined at a bend to an inwardlyextending second member 28 so as form an interior ledge. In each of the front and rear flanges 18, 19, the first and second members 26, 28 are preferably disposed at least substantially perpendicular to each other. The second members 28 of the front and rear flanges 18, 19 are preferably disposed at least substantially parallel to the tread plate 14. The support structure 12 is preferably formed from a single metal plate by appropriately cutting out the corners of the single plate and appropriately bending front, rear and end portions of the single plate to form the end flanges 16, the front flange 18 and the rear flange 19, respectively.

Preferably, a plurality of grip structures 32 and drain structures 34 extend from the tread plate 14 and at least partially define a plurality of grip openings 36 and drain openings 38 in the tread plate 14, respectively. The grip structures 32 extend upwardly from the top surface 22 of the tread plate 14, while the drain structures 34 extend downwardly from the bottom surface 24 of the tread plate 14. The grip structures 32 provide non-continuous gripping to footwear brought into contact with the tread plate 14, while the drain structures 34 facilitate the drainage of water from the top surface 22 of the tread plate 14 so as to prevent the pooling of water thereon.

In the embodiment of the invention shown in FIG. 2, there is a longitudinal middle row of drain structures 34 disposed between longitudinal front and rear rows of the grip structures 32. It should be appreciated, however, that the present invention is not limited to this particular arrangement of the grip structures 32 and the drain structures 34.

Figure 3:
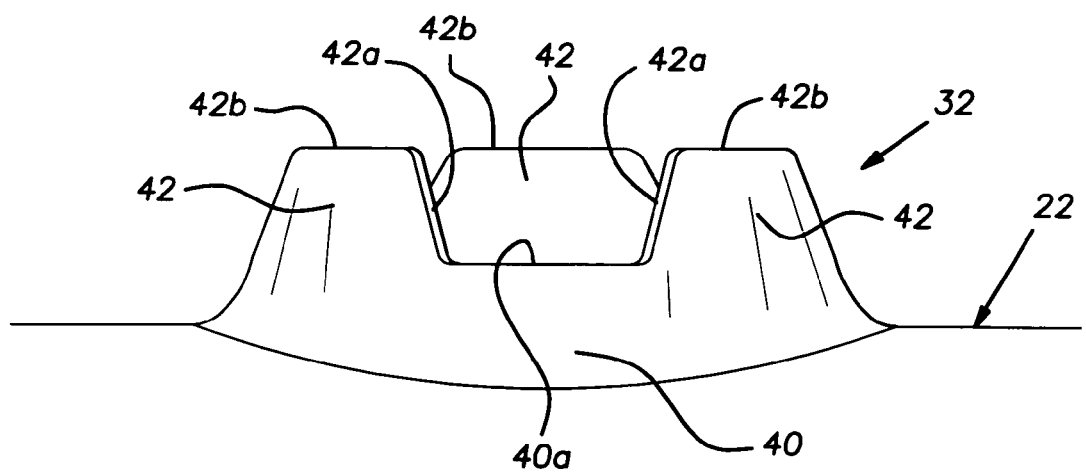
FIG. 3 is an elevational view of a grip structure in a tread plate of the step.
Figure 5:
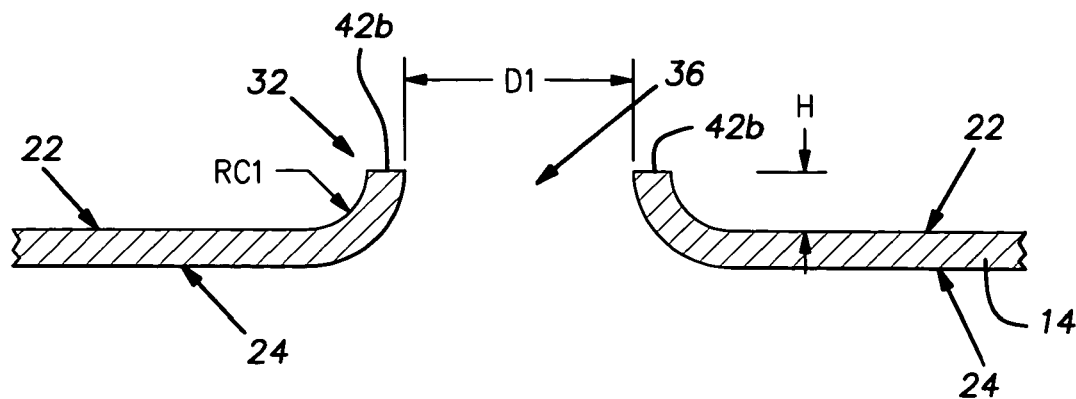
FIG. 5 is a vertical sectional view of the grip structure.

Referring now to FIGS. 3 and 5, each of the grip structures 32 comprises a curved base 40 that is joined to the top surface 22 of the tread plate 14. The base 40 preferably comprises a continuous curved side wall. More preferably, the base 40 comprises a frusto-conical side wall. A plurality of tabs 42 are joined to the base 40 and extend upwardly therefrom. The base 40 and each of the tabs 42 have at least substantially the same thickness as the thickness of the tread plate 14. Preferably, each of the tabs 42 has a substantially angular shape, with a pair of non-parallel sides 42a extending downwardly and outwardly from opposing ends of a free top end 42b. Bottom portions of the tabs are 42 integrally joined to top portions of the base 40. The tabs 42 at least partially define the grip opening 36, which has a diameter "D1", as is best shown in FIG. 5. The tabs 42 are spaced apart around the periphery or circumference of the base 40 so as to cooperate with the base 40 to form a plurality of alternating ridges and valleys, wherein the ridges are comprised of the top ends 42b of the tabs 42 and the valleys are comprised of top end portions 40a of the base 40. The sides 42a of the tabs 42 are joined to the top end portions 40a of the base 40 at bends. Both the top ends 42b of the tabs 42 and the top end portions 40a of the base 40 are slightly arcuate in the horizontal direction. Outer and inner edges of both the top ends 42b of the tabs 42 and the top end portions 40a of the base 40 are preferably uniform in height along their lengths. In addition, the top ends 42b of the tabs 42 are substantially horizontally disposed. The top end portions 40a of the base 40, however, slope slightly inward. The top ends 42b of the tabs 42 are disposed a height "H" above the top surface 22 of the tread plate 14, i.e., each grip structure 32 has a height "H". Preferably, the top end portions 40a of the base 40 have at least substantially the same arcuate length as the top ends 42b of the tabs 42.

In each grip structure 32, the base is joined to the top surface of the tread plate 14 so as to form a radius of curvature RC1 between the base and the top surface, wherein the ratio of the radius of curvature RC1 to the height H1 of the grip structure (i.e., RC1/H) is greater than 0.5, more preferably greater than 0.75, still more preferably greater than 1. In addition, each grip structure is constructed such that the ratio of the height H of the grip structure to the diameter D1 of the grip opening of the grip structure (i.e., H/D1) is less than 0.75, more preferably less than 0.5, still more preferably less than 0.3. Furthermore, the ratio of the height H of each grip structure 32 to the thickness "T" of the tread plate 14 (i.e., H/T) is preferably less than 3, more preferably less than 2. With the foregoing structure, the grip structures 32 have low profiles that do not require the grip structures 32 to be disposed closely together.

Figure 4:
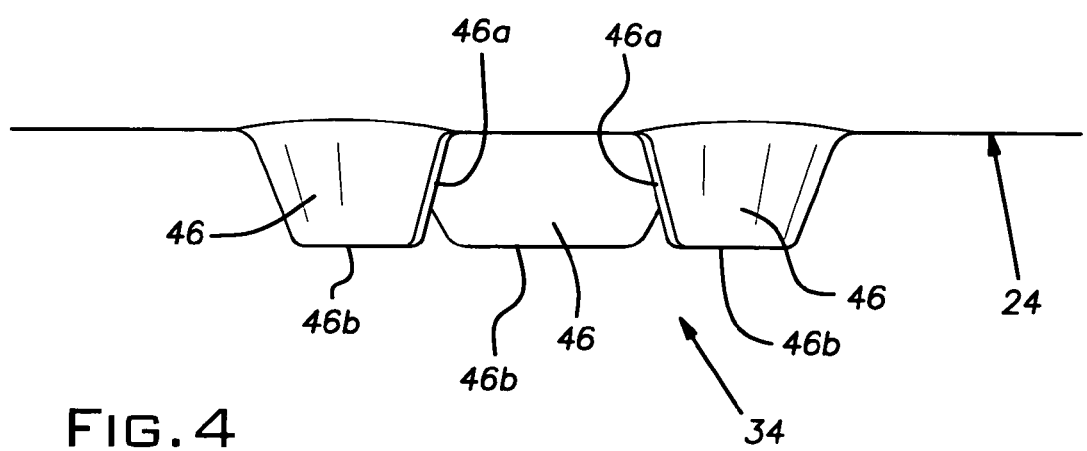
FIG. 4 is an elevational view of a drain structure in the tread plate of the step.
Figure 6:
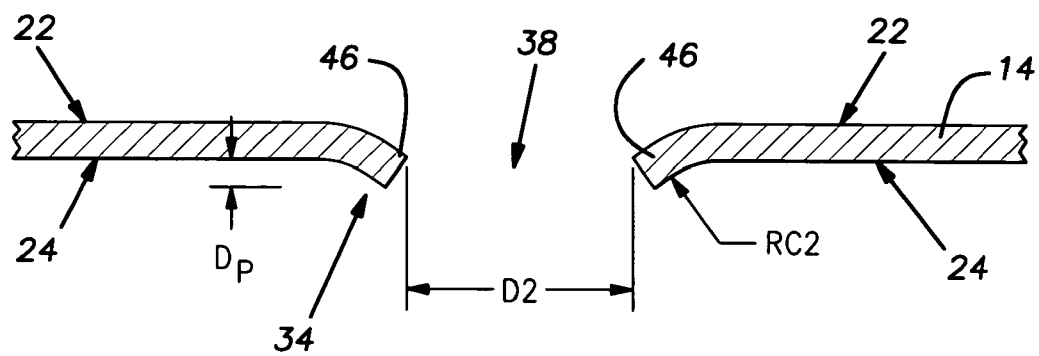
FIG. 6 is a vertical sectional view of the drain structure.

Referring now to FIGS. 4 and 6, each of the drain structures 34 comprises a plurality of tabs 46 joined to the bottom surface 24 of the tread plate 14 and extending downwardly therefrom. The tabs 46 have at least substantially the same thickness as the thickness of the tread plate 14. Preferably, each of the tabs 46 has a substantially angular shape, with a pair of non-parallel sides 46a extending upwardly and outwardly from opposing ends of a free bottom end 46b. Top portions of the tabs 46 are integrally joined to the bottom surface 24 of the tread plate 14. The tabs 46 at least partially define the drain opening 38, which has a diameter "D2", as best shown in FIG. 6. The bottom ends 46b of the tabs 46 are disposed a distance or depth "Dp" below the bottom surface 24 of the tread plate 14, i.e., each drain structure 34 has a depth "Dp".

In each drain structure 34, each tab 46 is joined to the bottom surface 24 of the tread plate 14 so as to form a radius of curvature RC2 between the tab 46 and the bottom surface 24, wherein the ratio of the radius of curvature RC2 to the depth Dp of the drain structure 34 (i.e., RC2/Dp) is greater than 1, more preferably greater than 2, still more preferably greater than 3. Preferably, the radius of curvature RC2 of the drain structures 34 is at least substantially the same as the radius of curvature RC1 of the grip structures 32.

The diameter D2 of the drain openings 38 of the drain structures 34 is preferably at least substantially the same as the diameter D1 of the grip openings 36 of the grip structures 32. The depth Dp of the drain structures 34, however, is preferably less than the height H of the grip structures 32. Still more preferably, the ratio of the depth Dp of the drain structures 34 to the height H of the grip structures 32 (Dp/H) is less than 1, more preferably less than 0.75, still more preferably less than 0.5.

In lieu of having the construction described above, the drain structures 34 may have the same structure (with the same dimensions) as the grip structures 32 (except for extending downwardly from the bottom surface 24), wherein the tabs 46 are joined to bases joined to the bottom surface 24.

Preferably, each of the grip structures 32 and each of the drain structures 34 is formed using a punching operation and an embossing operation, wherein in the punching operation, a hole is formed in the tread plate 14, and in the embossing operation, a boundary region of the tread plate 14 around the hole is pushed away from the tread plate 14 so as to extend out of the plane of the tread plate 14, i.e., so as to extend out of the plane of the top surface 22 or the bottom surface 24, as the case may be. A more detailed description of the formation of the grip structures 32 and the drain structures 34 is set forth in co-pending application Ser. No. 10/725, 341, entitled "ANTI-SLIP STEP FOR A MOTOR VEHICLE AND A METHOD OF FORMING THE SAME", which is assigned to the assignee of the present invention and is hereby incorporated by reference.

Figure 7:
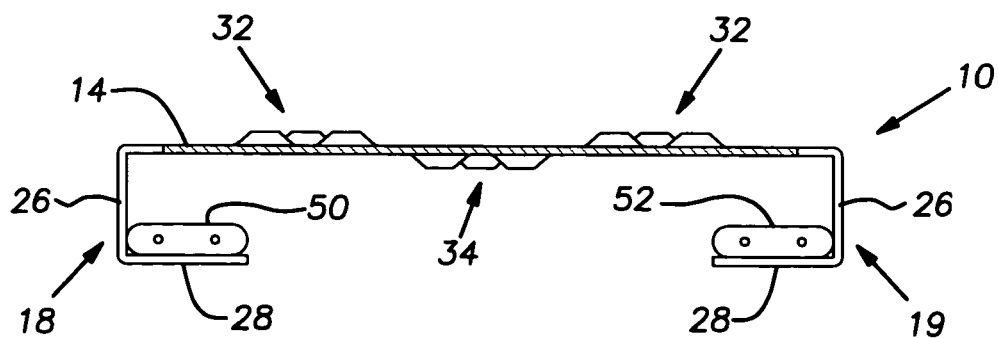
FIG. 7 is a sectional view of the step taken along line 7—7 in FIG. 2.

Referring back again to FIG. 2 and now to FIG. 7, a first heating device 50 is attached to the support structure 12, toward the front of the support structure 12. Preferably, a second heating device 52 is also attached to the support structure 12, toward the rear of the support structure 12, as is shown in FIG. 7. The first and second heating devices 50, 52 are electrical resistance heaters. Preferably, each of the first and second heating devices 50, 52 is a relatively thin and elongated flexible strip heater comprising a wire wound element or an etched foil element enclosed in a sheath composed of silicon rubber or other water resistant material, such as a polyimide. The elements of the first and second heating devices 50, 52 are designed to generate heat upon receiving power generated by a 12 volt DC battery 54 (shown schematically in FIGS. 8 and 9) of the truck 2. The elements are connected to the battery 54 by an electrical circuit, such as an electrical circuit 56 (shown in FIG. 8), or an electrical circuit 58 (shown in FIG. 9). Commercially available flexible strip heaters that may be used for the first and second heating devices 50, 52 are available from Heatron Inc. of Leavenworth, Kans.

The first and second heating devices 50, 52 are secured to the second members 28 of the front and rear flanges 18, 19, respectively, by pressure sensitive adhesive and/or mechanical fasteners, such as clips, or by other fastening means, such as heat bonding. Preferably, the first and second heating devices 50, 52 extend along all, or substantially all, of the lengths of the front and rear flanges 18, 19, respectively. In addition, preferably the entire widths of the first and second heating devices 50, 52 are disposed on the second members 28 of the front and rear flanges 18, 29, respectively, such that the first and second heating devices 50, 52 do not overhang inner edges of the second members 28, respectively.

When the first and second heating devices 50, 52 are provided with power from the battery 54, the first and second heating devices 50, 52 generate heat which is imparted to the front and rear flanges 18, 19. Since the support structure 12 is composed of a heat conductive material, the heat imparted to the first and second flanges 18, 19 is conducted to the tread plate 14, thereby raising the temperature of the tread plate 14 to a temperature above the freezing point of water so as to melt any ice or snow that has been deposited on the tread plate 14. The water produced by such melting passes through the drain structures 34 and is thereby drained from the tread plate 14. In this manner, the first and second heating devices 50, 52 cooperate with the drain structures 34 to keep the tread plate 14 clear of snow and ice and any water derived therefrom.

Figure 8:
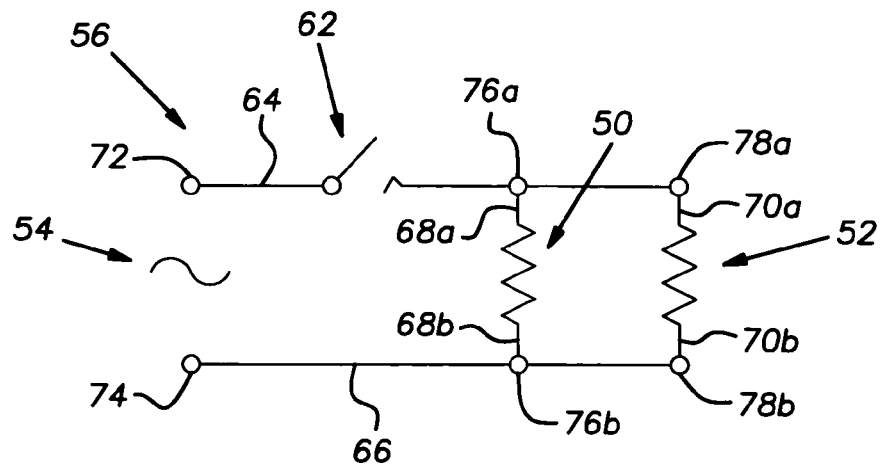
FIG. 8 is a schematic diagram of an electrical circuit that may be used to provide power to the heating devices.

As set forth above, the electrical circuit connecting the first and second heating devices to the battery may be the electrical circuit 56 shown in FIG. 8, which is simply an on/off circuit, wherein the supply of power to the first and second heating devices 50, 52 is manually controlled by actuating a switch or other interface device, such as a pushbutton. With reference now to FIG. 8, the electrical circuit 56 includes a manual switch 62, lines 64, 66, lead wires 68a,b and lead wires 70a,b. The lines 64, 66 are connected to terminals 72, 74 of the battery 54, respectively. The first heating device 50 is connected by the lead wires 68a,b to lines 64, 66 at nodes 76a,b, respectively, while the second heating device 52 is connected by the lead wires 70a,b to lines 64, 66 at nodes 78a,b, respectively. The switch 62 is connected into line 64, between the terminal 72 of the battery 54 and the node 76a. The switch 62 may physically be located inside the cab 4 of the truck 2, such as on the dashboard. When the switch 62 is moved to an "on" or "closed" position, power from the battery 54 is continuously provided to the first and second heating devices 50, 52, thereby ensuring that the tread plate 14 is continuously heated and is maintained at a temperature that is above the freezing point of water, i.e., above 0° C. (32° F.). In this manner, snow and ice are prevented from ever accumulating on the tread plate 14.

Figure 9:
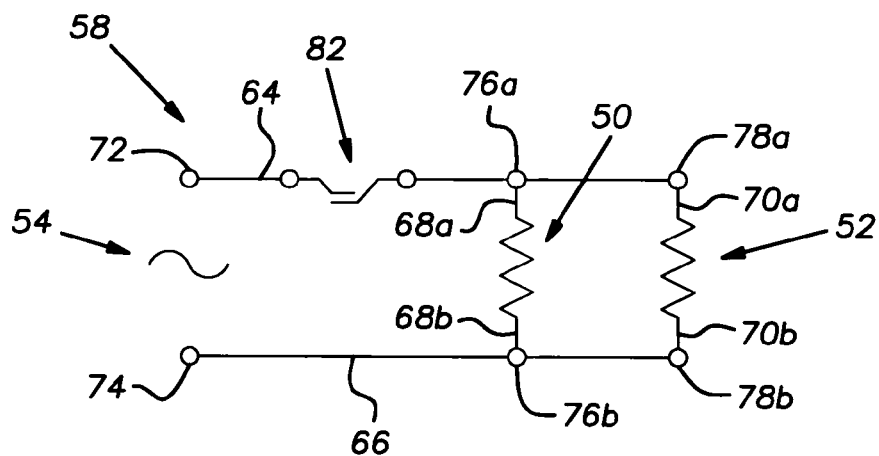
FIG. 9 is a schematic diagram of another electrical circuit that may be used to provide power to the heating devices.

In lieu of the electrical circuit 56, the electrical circuit connecting the first and second heating devices to the battery may be the electrical circuit 58 shown in FIG. 9, to which reference is now made. The electrical circuit 58 has the same construction as the electrical circuit 56, except the switch 62 has been removed and, in its place, a temperature switch 82 is connected into line 64. The temperature switch 82 is preferably an electro-mechanical temperature switch having a pair of contacts that are opened and closed by a bimetal disc sensing element that is disposed against the tread plate 14. Electro-mechanical temperature switches of this type are commercially available from Therm-O-Disc of Mansfield, Ohio and Thermtrol of North Canton, Ohio. The temperature switch 82 is constructed such that the contacts open when the temperature rises to a setpoint temperature and closes when the temperatures falls to a reset temperature. The setpoint temperature should be a temperature at which snow or ice should not be present on the tread plate 14, such as +10° C. (50° F.), while the reset temperature should be a temperature at which snow or ice can be present on the tread plate 14, such as −1° C. (30.2° F.). Assuming that the ambient temperature around the step 10 is below 0° C. (32° F.), the electrical circuit 58 is operable to periodically heat the step 10 in the manner described below.

When the temperature of the tread plate 14 reaches the reset temperature, the contacts of the temperature switch 82 close, which causes electricity from the battery 54 to flow through lines 64, 66 to the first and second heating devices 50, 52, thereby causing the first and second heating devices 50, 52 to generate heat. The heat from the first and second heating devices 50, 52 raises the temperature of the tread plate 14 until the temperature of the tread plate 14 reaches the setpoint temperature, at which point the contacts of the temperature switch 82 open and the supply of electricity to the first and second heating devices 50, 52 is cut-off. The tread plate 14 then cools until the temperature of the tread plate 14 reaches the reset temperature, at which point the contacts of the temperature switch 82 close and the cycle repeats.

It should be appreciated that both electrical circuit 56 and electrical circuit 58 can supply power from the battery 54 to the first and second heating devices 50, 52 when the engine of the truck 2 is not running.

In lieu of either the electrical circuit 56 or the electrical circuit 58, the electrical circuit connecting the first and second heating devices 50, 52 to the battery 54 may be an electrical circuit that provides electric power to the first and second heating devices 50, 52 in accordance with timed intervals, or when snow or ice is actually detected on the tread plate 14 by an ice detector, such as an optical ice detector, a microwave ice detector, or a capacitive ice detector. An even further possibility is to connect the first and second heating devices 50, 52 to the battery 54 such that the first and second heating devices 50, 52 are provided with power upon the starting of the engine of the truck 2. This latter possibility would be especially advantageous if the truck 2 was provided with a remote engine starter, which would permit the first and second heating devices 50, 52 to heat the step 10 before the operator enters the cab 4 of the truck 2.

Figure 10:
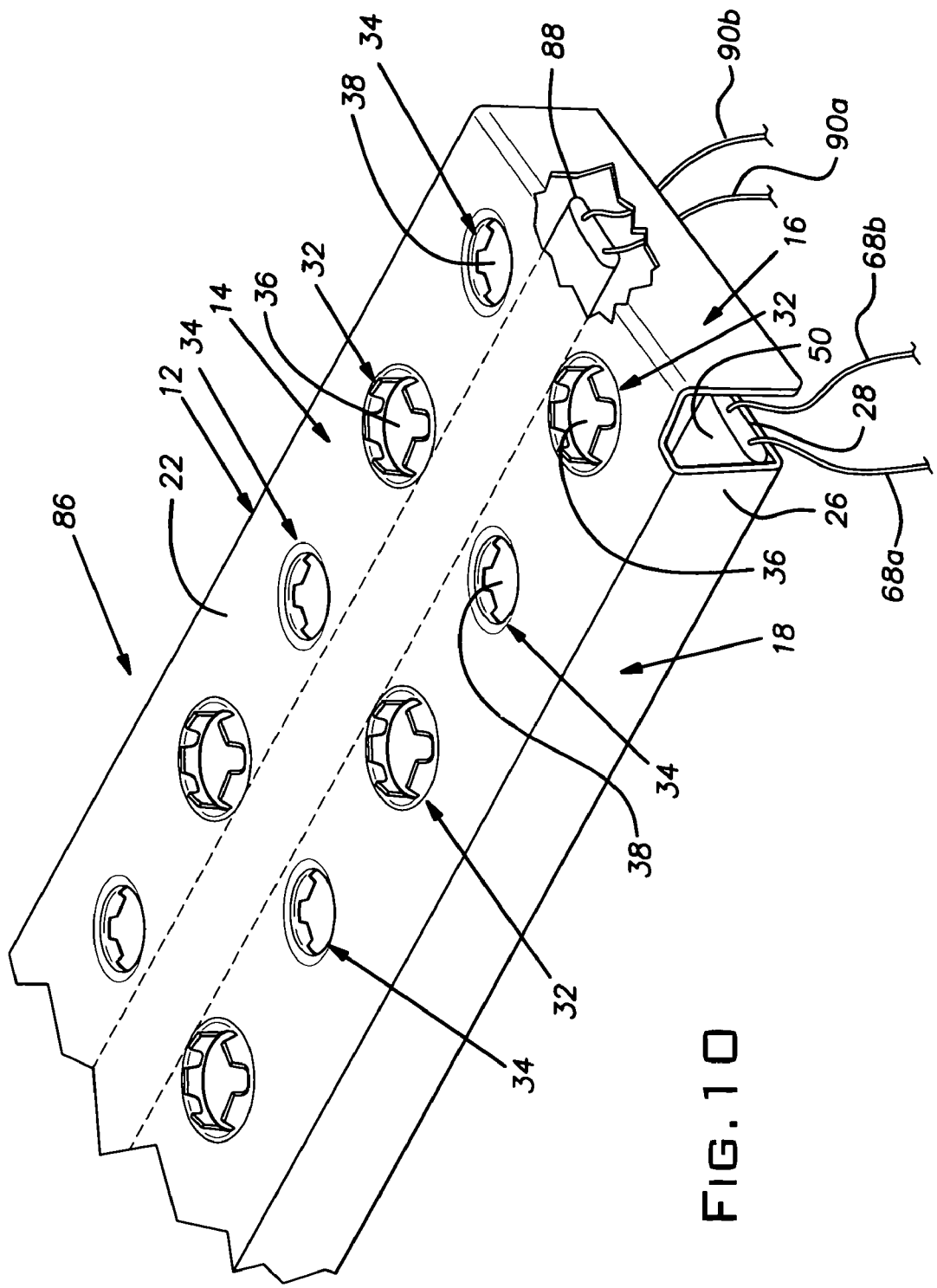
FIG. 10 is a top perspective view of a second step having heating devices secured thereto and constructed in accordance with a second embodiment of the present invention.

Referring now to FIG. 10, there is shown a step 86 constructed in accordance with a second embodiment of the present invention. The step 86 has the same construction as the step 10, except for the differences set forth below. The step 86 does not have a longitudinal middle row of the drain structures 34 disposed between longitudinal front and rear rows of the grip structures 32, such as step 10. Instead, step 86 only has spaced-apart longitudinal front and rear rows, each of which includes both grip structures 32 and drain structures 34. In each of the front and rear rows, the grip structures 32 and the drain structures 34 are arranged in an alternating manner, such that each pair of grip structures 32 is separated by a drain structure 34. The front and rear rows are separated by a longitudinally extending middle portion of the tread plate 14, which extends in an uninterrupted manner between the end flanges 16. A third heating device 88 is secured to a lower surface of the tread plate 14 in the middle portion of the tread plate 14. A portion of the step 86 is broken away to show an end portion of the third heating device 88, while a body portion of the third heating device 88 is shown in phantom. The third heating device 88 has the same construction as the first and second heating devices, i.e., is a relatively thin and elongated flexible strip heater. The third heating device 88 is disposed between the front and rear rows of the alternating grip structures 32 and drain structures 34 and is secured to the tread plate 14 by pressure sensitive adhesive and/or mechanical fasteners, such as clips, or by other fastening means, such as heat bonding. Preferably, the third heating device 88 extends along all, or substantially all, of the length of the tread plate 14, between the end flanges 16. Lead wires 90a, 90b of the third heating device 88 are connected to the battery 54 of the truck 2 in the same manner as the lead wires 68a,b and 70a,b of the first and second heating devices 50, 52, i.e., such as by electrical circuit 56 or electrical circuit 58. Upon being provided with power from the battery 54, the third heating device 88 generates heat in the same manner as the first and second heating devices 50, 52. The heat generated by the third heating device 88, however, is conveyed directly to the tread plate 14.

Although the step 86 has less grip structures 32 and drain structures 34 than the step 10, the step 86 has the third heating device 88 disposed against the tread plate 14, which will provide more rapid heating of the tread plate 14. Since a drain structure 34 is disposed between each pair of grip structures 32 in the step 86, water from melting snow or ice can still readily drain from the tread plate 14 of the step 86.

Figure 13:
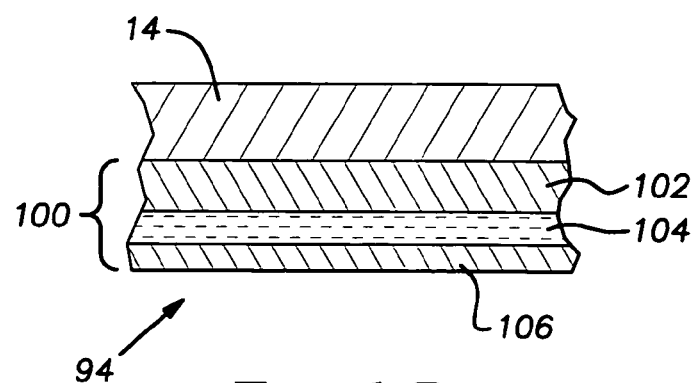
FIG. 13 is a sectional view of the third step.
Figure 11:
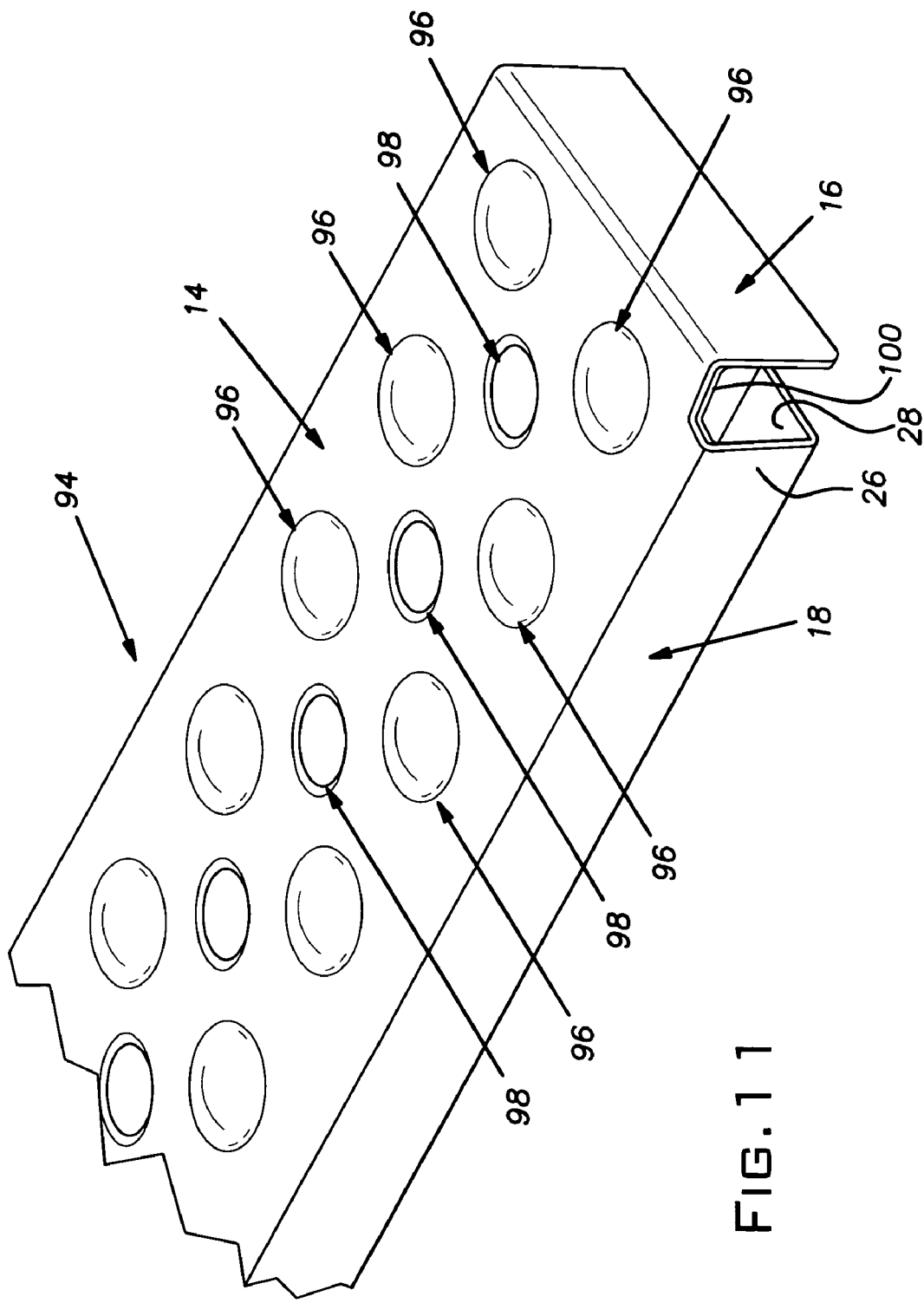
FIG. 11 is a top perspective view of a third step having a thick film heater formed on a bottom surface thereof and constructed in accordance with a third embodiment of the present invention.
Figure 12:
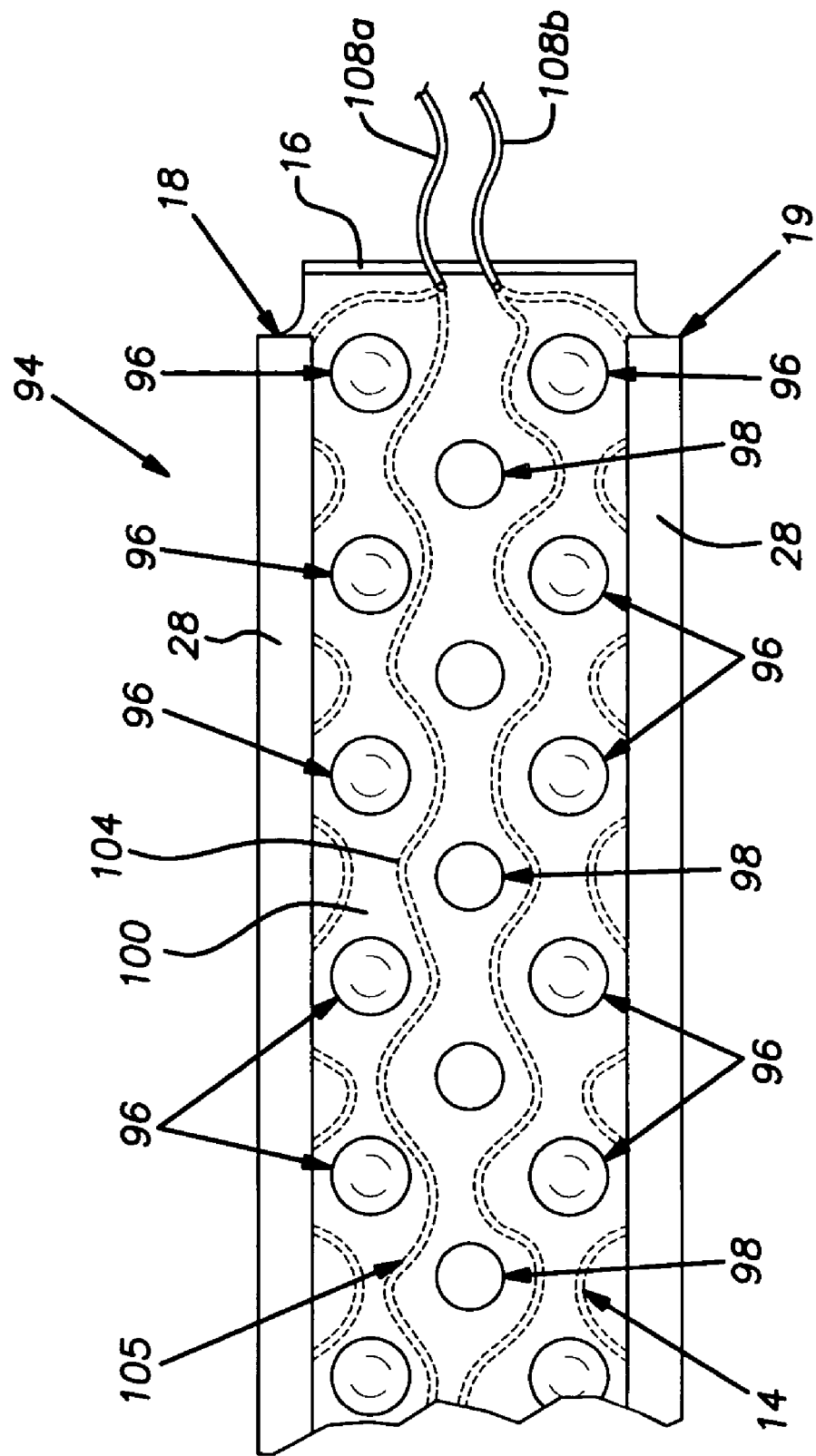
FIG. 12 is a bottom view of the third step.

Referring now to FIGS. 11 and 12, there is shown a step 94 constructed in accordance with a third embodiment of the present invention. The step 94 has the same construction as the step 10, except for the differences set forth below. The step 94 does not have the first and second heating devices 50, 52. In addition, the step 94 is preferably formed from steel and does not have any grip structures 32 or drain structures 34. Instead, the step 94 has a plurality of grip structures 96 and a plurality of holes 98. The grip structures 96 are upwardly-directed dome shaped protrusions or bumps and are arranged in longitudinally extending front and rear rows. The holes 98 extend through the tread plate 14 and are arranged in a longitudinally extending middle row, which is disposed between the front and rear rows of the grip structures 96. A thick film heater 100 is formed over a bottom surface of the tread plate 14. With reference now also to FIG. 13, the thick film heater 100 comprises a dielectric layer 102, a resistor layer 104 and a protective layer 106.

Before the thick film heater 100 is formed on the tread plate 14, the bottom surface of the tread plate 14 is preferably surface treated by blasting the tread plate 14 with sand or grit and then cleaning the tread plate 14 with an organic solvent to remove any oils that may be present. The dielectric layer 102 is then applied to the bottom surface of the tread plate 14 so as to cover all of the tread plate 14. The dielectric layer 102 may be comprised of any of a number of conventional dielectric coatings. Such coatings may be classified as "porcelain enamel", "glass" or "ceramic". Such "porcelain enamel" or "glass" coatings may be referred to as "vitreous" coatings. Such "ceramic" coatings may be referred to as "devitrified" coatings. Examples of such coatings may be found in Lim et al., U.S. Pat. No. 5,002,903; Ohmura et al., U.S. Pat. No. 4,361,654; Kaup et al., U.S. Pat. No. 3,935,088; Moritsu et al., U.S. Pat. No. 4,172,733; Van derVliet, U.S. Pat. No. 4,085,021; Hang et al., U.S. Pat. No. 4,256,796; Andrus et al., U.S. Pat. No. 4,358,541; Chyung, U.S. Pat. No. 4,385,127; Gazo et al. U.S. Pat. No. 3,841,986 and Hughes U.S. Pat. No. 3,575,838. Applicants hereby incorporate by reference the coatings disclosed in the aforementioned U.S. Patents, including the methods of making such coatings and applying such coatings to a metal substrate. As used herein the term "porcelain enamel" is intended to encompass all of the aforementioned coatings. For purposes of example, the dielectric layer 102 may be composed of an insulating ceramic, such as $Al_2O_3$, $Al_2O_3.MgO$, $Y_2O_3$, $SiO_2$, $ZrO_2$ and mixtures thereof, and may be thermally applied to tread plate 14, such as by plasma spraying. The dielectric layer 102 preferably has a thickness in a range of from about 50 to 500 μm.

Although not shown, a bonding layer may be formed between the dielectric layer 102 and the bottom surface of the tread plate 14 to promote adhesion to the tread plate 14. The bonding layer may, for example, be an alloy of Al, Mo and Ni.

After the dielectric layer 102 has been formed on the bottom surface of the tread plate 14, the resistor layer 104 is screen printed on the dielectric layer 102 in a heater pattern 105 that extends substantially the entire length of the tread plate 14 between the end flanges 16 and is configured to bend around the holes 98 and preferably also the grip structures 98. The resistance layer 104 is preferably composed of particles of silver or a silver/palladium alloy mixed into a ceramic matrix, such as $Al_2O_3$, $Al_2O_3.MgO$. The resistance layer 104 preferably has a thickness in a range of from about 5 to 30 μm. After the resistance layer 104 has been applied to the dielectric layer 102, the resistance layer 104 is dried and fired. Ends of the heater pattern are joined to terminal leads 108a,b by a bonding agent, such as a brazing alloy or a fritted conductive noble metal paste.

After the resistance layer 104 is dried and fired, the protective layer 106 is disposed over the resistance layer 104. The protective layer 106 may be a ceramic oxide, (such as $Al_2O_3$ or $ZrO_2$) that is plasma sprayed over the resistance layer 104. Alternately, the protective layer 106 may be a glass-based overglaze that is screen printed over the resistance layer and subsequently dried and fired. Glass-based overglazes typically comprise Si, B, O, Al, Pb, as well as alkaline earth elements, such as Mg, Ca, Sr and Ba, and alkaline elements, such as Li, Na and K. The protective layer 106 preferably has a thickness in a range of from about 10 to 40 μm. Although not shown, an outermost weather-resistant layer may be disposed over the protective layer. Such a weather-resistant layer may be composed of a fluoropolymer, such as polytetrafluoroethylene.

The terminal leads 108a,b of the thick film heater 100 are connected to the battery 54 of the truck 2 in the same manner as the lead wires 68a,b and 70a,b of the first and second heating devices 50, 52 of the step 10, i.e., such as by the electrical circuit 56 or the electrical circuit 58. Upon being provided with power from the battery 54, the thick film heater 100 generates heat that is conducted to the tread plate 14, thereby causing the tread plate 14 to warm up and melt any snow or ice that may be disposed on the tread plate 14.

It should be appreciated that in addition to commercial trucks, such as truck 2, the heated anti-slip steps 10, 86, 94 of the present invention may be utilized on light trucks, such as pick up trucks, and sport utility vehicles.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A vehicle comprising:
    (a.) a chassis;
    (b.) a plurality of wheels mounted to the chassis;
    (c.) an operator compartment supported on the chassis;
    (d.) a battery for providing power to the vehicle;
    (e.) a metal step for supporting an operator of the vehicle when the operator enters or leaves the operator compartment, said step being disposed proximate to the operator compartment and including
        a tread plate and an electrical resistance heater disposed proximate to the tread plate;
        a front flange joined to a front side portion of the tread plate and extending downwardly therefrom, wherein the heater is secured to the front flange; and
    (f.) an electrical circuit connecting the heater to the battery, said electrical circuit being operable to supply power from the battery to the heater, thereby causing the heater to heat the step and melt any snow or ice that may be present on the step.

2. The vehicle of claim 1, wherein the tread plate has a plurality of drain holes extending therethrough, and wherein the step further comprises a plurality of grip structures extending upwardly from a top surface of the tread plate.

3. The vehicle of claim 2, wherein the step further comprises a plurality of drain structures extending downwardly from a bottom surface of the tread plate, said drain structures at least partially defining the drain holes.

4. The vehicle of claim 1, wherein the step further comprises:
    a rear flange joined to a rear side portion of the tread plate and extending downwardly therefrom; and
    a second electrical resistance heater secured to the rear flange.

5. The vehicle of claim 1, wherein the heater is secured to a bottom surface of the tread plate.

6. The vehicle of claim 1, wherein the heater is a thick film heater formed over a bottom surface of the tread plate.

7. The vehicle of claim 1, wherein the electrical circuit includes a temperature switch that controls the supply of power to the heater.

8. The vehicle of claim 1, wherein the electrical circuit includes a manual switch that controls the supply of power to the heater, said switch being disposed in the operator compartment of the vehicle.

9. A heated step assembly for a vehicle, said assembly comprising:
    (a.) a battery;
    (b.) a step for supporting an operator of the vehicle, said step including:
        a metal tread plate with a top surface and a bottom surface, said tread plate having a plurality of drain holes extending therethrough;
        a plurality of grip structures extending upwardly from the top surface of the tread plate;
        a plurality of drain structures extending downwardly from the bottom surface of the tread plate, said drain structures at least partially defining the drain holes;
        a front flange joined to a front side portion of the tread plate and extending downwardly therefrom, and
        an electrical resistance heater disposed proximate to the tread plate and secured to the front flange; and
    (c.) an electrical circuit connecting the heater to the battery, said electrical circuit being operable to supply power from the battery to the heater, thereby causing the heater to heat the step and melt any snow or ice that may be present on the step.

10. The heated step assembly of claim 9, wherein the heater is secured to the bottom surface of the tread plate.

11. The heated step assembly of claim 9, wherein the heater is a thick film heater formed over the bottom surface of the tread plate.

* * * * *